US011500921B2

(12) United States Patent
Wang et al.

(10) Patent No.: US 11,500,921 B2
(45) Date of Patent: Nov. 15, 2022

(54) IMAGE ACQUISITION METHOD AND DEVICE, ELECTRONIC DEVICE AND STORAGE MEDIUM

(71) Applicant: BOE TECHNOLOGY GROUP CO., LTD., Beijing (CN)

(72) Inventors: Bingqian Wang, Beijing (CN); Jianbo Han, Beijing (CN)

(73) Assignee: Beijing BOE Technology Development Co., Ltd., Beijing (CN)

(*) Notice: Subject to any disclaimer, the term of this patent is extended or adjusted under 35 U.S.C. 154(b) by 109 days.

(21) Appl. No.: 17/035,388

(22) Filed: Sep. 28, 2020

(65) Prior Publication Data

US 2021/0191972 A1    Jun. 24, 2021

(30) Foreign Application Priority Data

Dec. 19, 2019  (CN) .......................... 201911320909.4

(51) Int. Cl.
*G06F 16/58* (2019.01)
*G06F 16/538* (2019.01)

(52) U.S. Cl.
CPC ........ *G06F 16/5866* (2019.01); *G06F 16/538* (2019.01)

(58) Field of Classification Search
CPC ........... G06F 2203/04803; G06F 21/84; G06F 3/0481; G06F 3/14; G06F 1/1626; G06F 3/04842; G06F 16/538; G06F 16/586
See application file for complete search history.

(56) References Cited

U.S. PATENT DOCUMENTS

| | | | |
|---|---|---|---|
| 2011/0145068 A1* | 6/2011 | King | H04N 1/32144 348/222.1 |
| 2012/0224743 A1* | 9/2012 | Rodriguez | G06T 11/60 382/103 |
| 2013/0106685 A1* | 5/2013 | Davis | G06F 16/434 345/156 |
| 2014/0118479 A1* | 5/2014 | Rapoport | H04N 5/23238 348/E7.001 |
| 2015/0243324 A1* | 8/2015 | San | H04N 13/261 386/278 |
| 2020/0357117 A1* | 11/2020 | Lyman | G06T 7/0012 |

* cited by examiner

*Primary Examiner* — Angelica Ruiz
(74) *Attorney, Agent, or Firm* — McDermott Will & Emery LLP

(57) ABSTRACT

The present disclosure provides an image acquisition method, image acquisition device, electronic device, and computer-readable storage medium. The method includes: acquiring an image retrieval text input by a user and a screen display status of an image display device; determining retrieval intention information and a retrieval keyword according to the image retrieval text, wherein the retrieval intention information comprises information reflecting the user's retrieval intention, and the retrieval keyword comprises a keyword used to retrieve images; acquiring at least one candidate image according to the retrieval intention information and the retrieval keyword; and selecting a target image from the at least one candidate image according to the screen display status.

14 Claims, 5 Drawing Sheets

IMAGE ACQUISITION METHOD AND DEVICE, ELECTRONIC DEVICE AND STORAGE MEDIUM

CROSS-REFERENCE TO RELATED APPLICATION(S)

The present disclosure claims priority to Chinese Patent Application No. 201911320909.4, filed on Dec. 19, 2019, and titled "Image acquisition method and device, electronic device and storage medium", the entire disclosure of which is incorporated herein by reference.

TECHNICAL FIELD

The present disclosure relates to the field of medical technology, and in particular to an image acquisition method and device, electronic device and storage medium.

BACKGROUND

With the development of living standards and social economy, people's demand for artistic accomplishment and family art decoration continues to increase, so electronic picture frames are widely used. However, as an art form, different people have different hobbies and perceptions of painting.

At present, when a user searches for the painting he wants to watch, he usually searches for related paintings by entering keywords (such as painting name, author name, and the like), and this method usually feeds back massive search results to the user. Then, the user selects the paintings he needs to watch from the massive search results. This undoubtedly increases the time required for the user to search for paintings and reduces the user experience.

SUMMARY

The present disclosure provides an image acquisition method, comprising:
acquiring an image retrieval text input by a user and a screen display status of an image display device;
determining retrieval intention information and a retrieval keyword according to the image retrieval text, wherein the retrieval intention information comprises information reflecting the user's retrieval intention, and the retrieval keyword comprises a keyword used to retrieve images;
acquiring at least one candidate image according to the retrieval intention information and the retrieval keyword; and
selecting a target image from the at least one candidate image according to the screen display status.

Alternatively, the determining retrieval intention information and a retrieval keyword according to the image retrieval text comprises:
acquiring the retrieval keyword and at least one piece of intention information according to the image retrieval text; and
selecting the retrieval intention information from the at least one piece of intention information according to semantic information of the image retrieval text.

Alternatively, before the acquiring the image retrieval text input by the user and the screen display status of the image display device, the method further comprises:
acquiring a plurality of images;
acquiring image description information of the plurality of images; and
storing the plurality of images in a preset image database, with the image description information of the plurality of images as an index.

Alternatively, the acquiring at least one candidate image according to the retrieval intention information and the retrieval keyword comprises:
acquiring a plurality of candidate images from the preset image database according to the retrieval keyword; and
acquiring at least one candidate image that meets the retrieval intention information from the plurality of candidate images.

Alternatively, the acquiring the plurality of candidate images from the preset image database according to the retrieval keyword comprises:
when there is no index matching the retrieval keyword in the preset image database, acquiring a retrieval index whose relevance degree with the retrieval keyword is greater than a relevance degree threshold; and
acquiring the plurality of candidate images from the preset image database according to the retrieval index.

Alternatively, the selecting the target image from the at least one candidate image according to the screen display status comprises:
selecting at least one candidate target image whose image quality is higher than a quality threshold from the at least one candidate image; and
selecting a target image that meets a screen display condition from the at least one candidate target image according to the screen display status.

Alternatively, the selecting the target image that meets the screen display condition from the at least one candidate target image according to the screen display status comprises:
when the screen display status is a horizontal screen display status, selecting a target image that meets a horizontal screen display condition from the at least one candidate target image; and
when the screen display status is a vertical screen display status, selecting a target image that meets a vertical screen display condition from the at least one candidate target image.

The embodiment of the present disclosure provides an image acquisition device, comprising:
a display status acquisition circuit configured to acquire an image retrieval text input by a user and a screen display status of an image display device;
an intention and keyword determination circuit configured to determine retrieval intention information and a retrieval keyword according to the image retrieval text, wherein the retrieval intention information comprises information reflecting the user's retrieval intention, and the retrieval keyword comprises a keyword used to retrieve images;
a candidate image acquisition circuit configured to acquire at least one candidate image according to the retrieval intention information and the retrieval keyword; and
a target image selecting circuit configured to select a target image from the at least one candidate image according to the screen display status.

Alternatively, the intention and keyword determination circuit comprises:
an intention information acquisition circuit configured to acquire the retrieval keyword and at least one piece of intention information according to the image retrieval text; and a retrieval intention selecting circuit configured to select the retrieval intention information from the at least one piece of intention information according to semantic information of the image retrieval text.

Alternatively, the device further comprises:

a multi-image acquisition circuit configured to acquire a plurality of images;

a description information acquisition circuit configured to acquire image description information of the plurality of images; and a multi-image storage circuit configured to store the plurality of images in a preset image database, with the image description information of the plurality of images as an index.

Alternatively, the candidate image acquisition circuit comprises:

a mufti-candidate-image acquisition circuit configured to acquire a plurality of candidate images from the preset image database according to the retrieval keyword; and a candidate image acquisition circuit configured to acquire at least one candidate image that meets the retrieval intention information from the plurality of candidate images.

Alternatively, the multi-candidate-image acquisition circuit comprises:

a retrieval index acquisition subcircuit configured to, when there is no index matching the retrieval keyword in the preset image database, acquire a retrieval index whose relevance degree with the retrieval keyword is greater than a relevance degree threshold; and a multi-candidate-image acquisition subcircuit configured to acquire the plurality of candidate images from the preset image database according to the retrieval index.

Alternatively, the target image selecting circuit comprises:

a candidate target image selecting circuit configured to select at least one candidate target image whose image quality is higher than a quality threshold from the at least one candidate image;

a target image acquisition circuit configured to select a target image that meets a screen display condition from the at least one candidate target image according to the screen display status.

Alternatively, the target image acquisition circuit comprises:

a first target image selecting subcircuit configured to, when the screen display status is a horizontal screen display status, select a target image that meets a horizontal screen display condition from the at least one candidate target image;

a second target image selecting subcircuit configured to, when the screen display status is a vertical screen display status, select a target image that meets a vertical screen display condition from the at least one candidate target image.

The embodiment of the present disclosure provides an electronic device, comprising:

a processor, and a memory having a computer program stored thereon and executable by the processor, wherein the processor executes the program to implement the above-mentioned image acquisition method.

The embodiment of the present disclosure provides a computer-readable storage medium having computer instructions stored thereon, the computer instructions, when executed by a processor of an electronic device, enable the electronic device to execute the above-mentioned image acquisition method.

DETAILED DESCRIPTION

In order to make the above objects, features and advantages of the present disclosure more obvious and understandable, the present disclosure will be further described in detail in conjunction with the accompanying drawings and specific embodiments.

Figure 1:
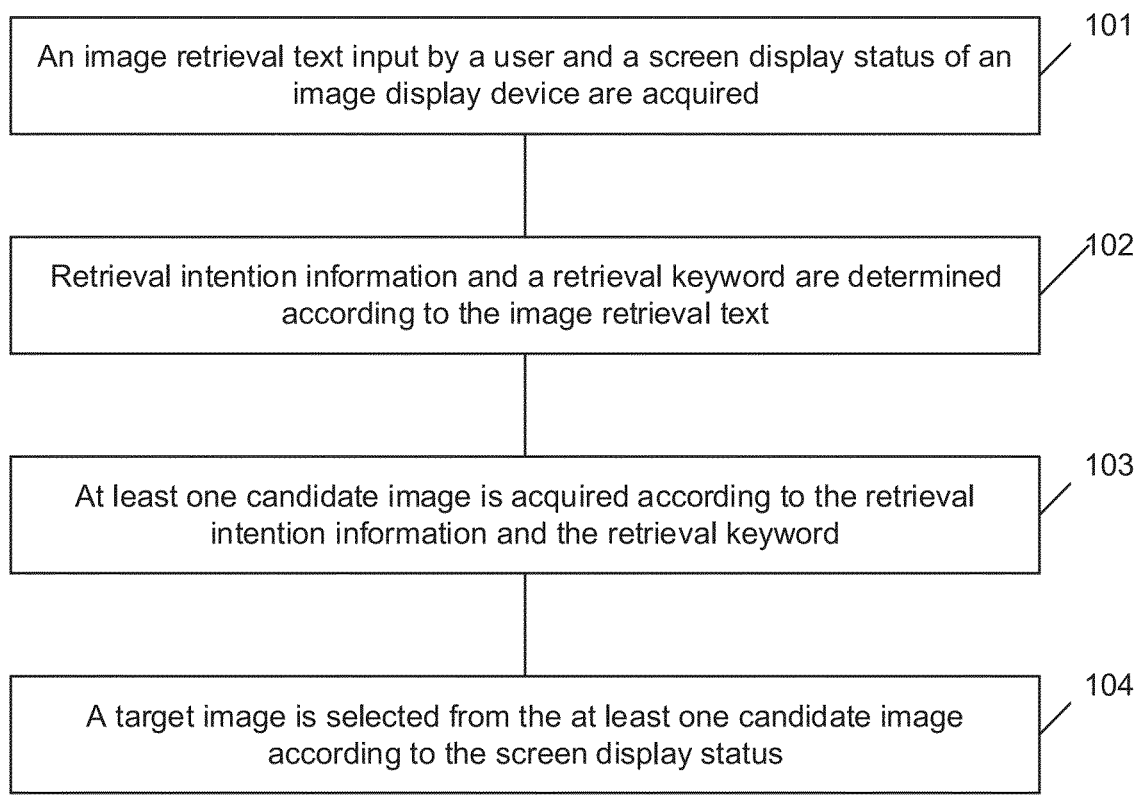
FIG. 1 shows a flowchart of steps of an image acquisition method according to an embodiment of the present disclosure.

Referring to FIG. 1, a flowchart of steps of an image acquisition method according to an embodiment of the present disclosure is shown, which may specifically include the following steps.

Step 101: an image retrieval text input by a user and a screen display status of an image display device are acquired.

The embodiments of the present disclosure may be applied to a scene where an image (such as a painting, and the like) required by the user is retrieved for the user.

The image retrieval text refers to the text input by the user to acquire the image required by the user. The image retrieval text may be a long sentence text or a question text, such as "Who is the author of Mona Lisa?" "Picasso's famous paintings," and the like.

Of course, it is not limited to this. The image retrieval text may also be a keyword text. Specifically, it may be determined according to the real requirements, which is not limited in the embodiment of the present disclosure.

The image display device refers to the device used by the user to input the image retrieval text.

In the present disclosure, the image display device may be a mobile terminal, for example, a mobile electronic device such as a mobile phone, a PAD (Portable Android Device). The image display device may also be a PC (Personal Computer) terminal, such as a desktop computer, a notebook computer, and the like. Specifically, it may be determined according to actual conditions, which is not limited in the embodiment of the present disclosure.

The screen display status refers to the display status of the screen of the image display device. The screen display status may be the horizontal or vertical screen status of the screen, the screen resolution, and the like. Specifically, it may be determined according to real requirements, which is not limited in the embodiment of the present disclosure.

In some examples, the user may provide the screen display status of the image display device when the user enters the image retrieval text, so that the intelligent question and answer system can acquire the screen display status of the image display device.

In some examples, the intelligent question and answer system may ask the user about the screen display status after the user enters the image retrieval text, and acquire the screen display status of the image display device according to the answer input by the user.

It is understandable that the foregoing examples are only examples for better understanding of the technical solutions of the embodiments of the present disclosure, and are not intended as the limitation to the embodiments of the present disclosure.

After the image retrieval text input by the user and the screen display status of the image display device are acquired, step 102 is executed.

Step 102: retrieval intention information and a retrieval keyword are determined according to the image retrieval text.

A retrieval keyword refers to a keyword used to retrieve images, for example, the retrieval keywords in the text "Who is the author of Mona Lisa?" are "Mona Lisa" and "Author"; and the keywords in the text "Picasso's famous paintings" are "Picasso", "famous paintings", and so on.

After acquiring the image retrieval text input by the user, the image retrieval text may be segmented to acquire a plurality of word segmentation texts, and the plurality of word segmentation texts may be combined to obtain a retrieval keyword.

Retrieval intention information refers to information used to reflect the user's retrieval intention. For example, regarding the text "Who is the author of Mona Lisa?" the retrieval intention is to find the author of the painting "Mona Lisa", not to find the painting "Mona Lisa"; and regarding the text "Picasso's famous paintings", the retrieval intention is to find Picasso's famous paintings, not to find Picasso's character information.

After acquiring the image retrieval text input by the user, retrieval intention information may be determined according to the semantic information of the image retrieval text. Specifically, the context of the image retrieval text and the sentence type of the image retrieval text may be combined to comprehensively determine the retrieval intention information.

It is understandable that the foregoing examples are only examples for better understanding of the technical solutions of the embodiments of the present disclosure, and are not intended as the limitation to the embodiments of the present disclosure.

After the retrieval intention information and the retrieval keyword are determined according to the image retrieval text, step 103 is executed.

Step 103: at least one candidate image is acquired according to the retrieval intention information and the retrieval keyword.

Candidate images refer to images retrieved from a preset image database and used as candidates provided to the user.

After the retrieval intention information and the retrieval keyword are determined, a plurality of relevant images may be selected from the preset image database according to the retrieval keyword. After acquiring a plurality of images, at least one candidate image that meets the retrieval intention information is selected from the plurality of images according to the retrieval intention information.

After at least one candidate image is acquired according to the retrieval intention information and the retrieval keyword, step 104 is executed.

Step 104: a target image is selected from the at least one candidate image according to the screen display status.

The target image refers to the image that is selected from the candidate images according to the screen display status and provided to the user. For example, the candidate images include image 1, image 2, image 3, image 4, and image 5. When image 1 and image 3 are selected from the candidate images according to the screen display status and provided to the user, image 1 and image 3 are the target images.

After acquiring at least one candidate image according to the retrieval intention information and the retrieval keyword, the target image is selected from the at least one candidate image according to the screen display status of the image display device. For example, the candidate images include image 1, image 2, image 3, image 4 and image 5. The screen display status of the image display device is a horizontal display. Image 1 and image 5 are horizontally displayed images, and image 2, image 3 and image 4 are vertically displayed images. Then, image 1 and image 5 are the final target images.

It is understandable that the foregoing examples are only examples for better understanding of the technical solutions of the embodiments of the present disclosure, and are not intended as the limitation to the embodiments of the present disclosure.

After selecting the target image, the target image may be fed back to the image display device, so that the image display device displays the target image.

The image acquisition method according to the embodiments of the present disclosure acquires the image retrieval text input by the user and the screen display status of the image display device, determines retrieval intention information and a retrieval keyword according to the image retrieval text, acquires at least one candidate image according to the retrieval intention information and the retrieval keyword, and selects a target image from the at least one candidate image according to the screen display status. In the embodiment of the present disclosure, the retrieval is performed by combining the intention and a keyword of the retrieval text input by the user. Compared with the retrieval method that is only based on a keyword, the amount of feedback data can be greatly reduced. In addition, combining the screen display status of the image display device to acquire the final image can reduce the amount of feedback data and further improve the user experience.

Figure 2:
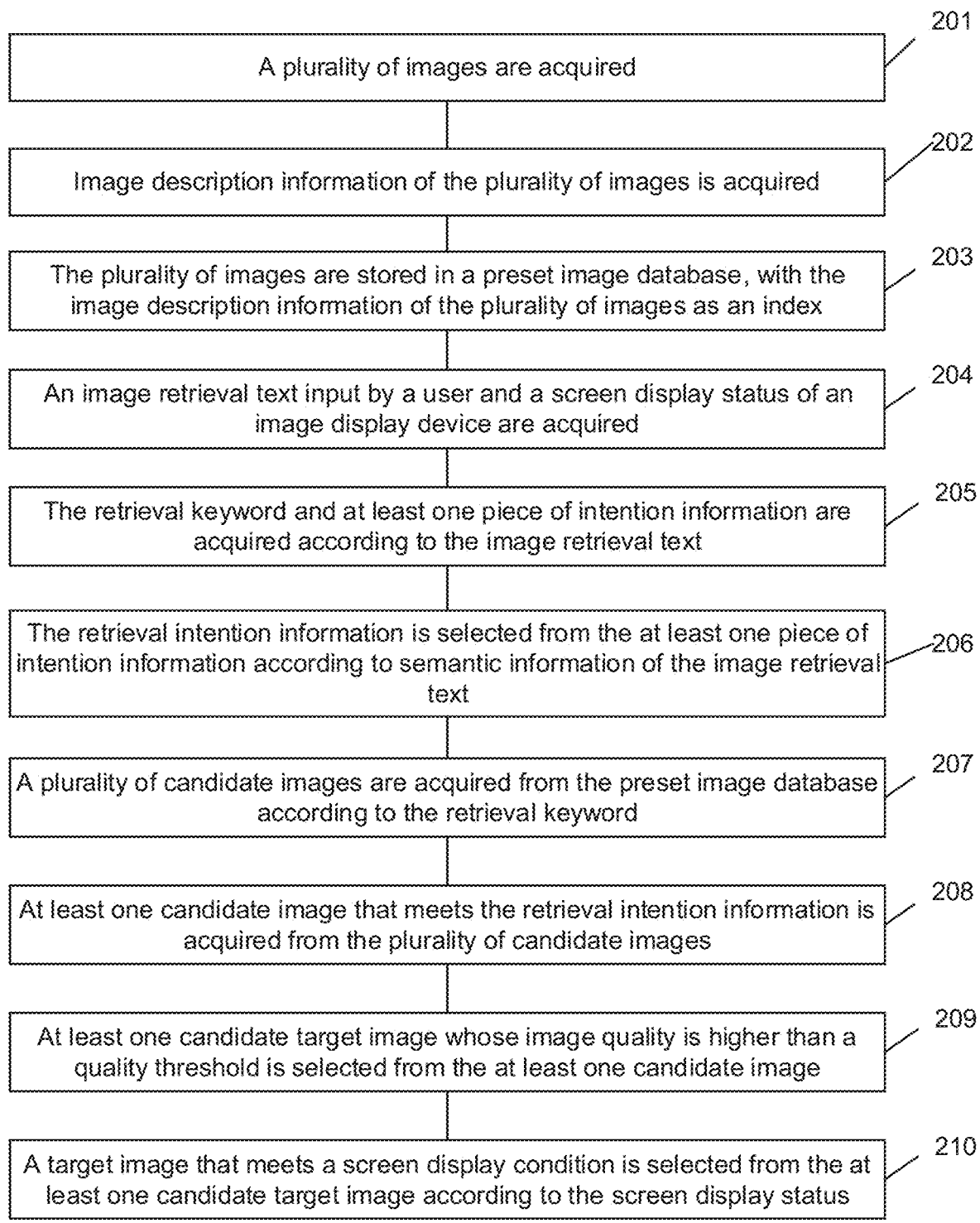
FIG. 2 shows a flowchart of steps of another image acquisition method according to an embodiment of the present disclosure.

Referring to FIG. 2, it shows a flowchart of steps of an image acquisition method according to an embodiment of the present disclosure, which may specifically include the following steps.

Step 201: a plurality of images are acquired.

The embodiments of the present disclosure may be applied to a scene where an image (such as a painting, and the like) required by the user is retrieved for the user.

In this embodiment, a detailed description may be made in conjunction with the intelligent question and answer system. First, the intelligent question and answer system will be described as follows with reference to FIG. 2a.

Figure 2A:
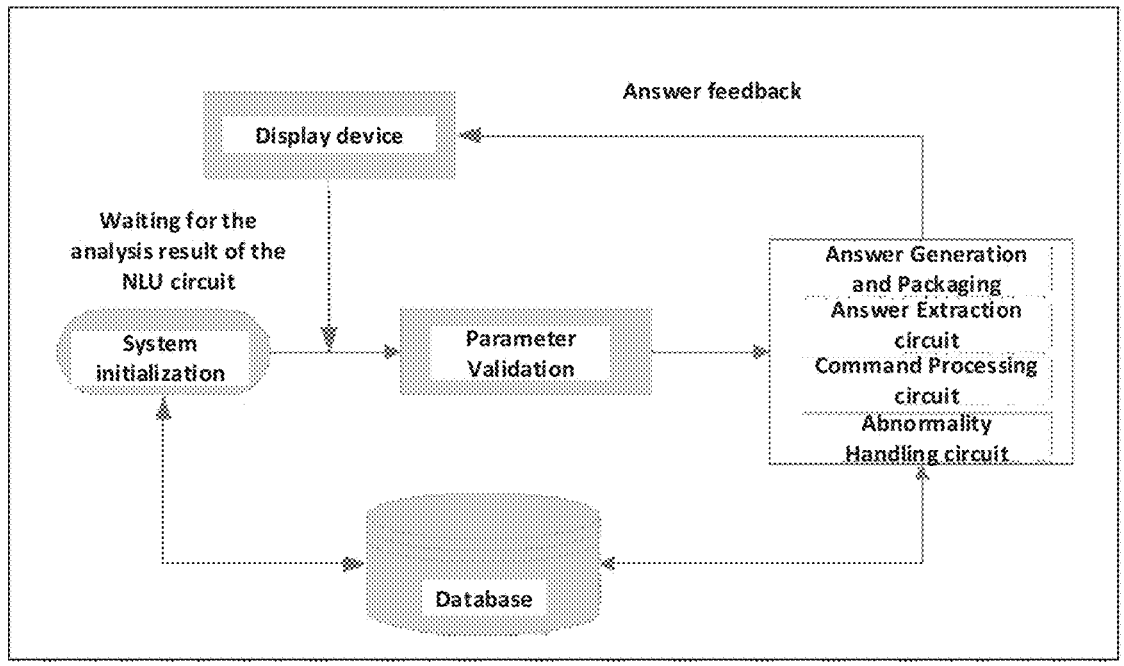
FIG. 2a shows a schematic diagram of an intelligent question and answer system according to an embodiment of the present disclosure.

Referring to FIG. 2a, there is shown a schematic diagram of an intelligent question and answer system according to an embodiment of the present disclosure. As shown in FIG. 2a, after the system is initialized, it will wait for the input of relevant parameters, including the retrieval keyword and retrieval intention information acquired by the intention understanding circuit, and the screen display status such as horizontal or vertical screen, and the like. Then the system will verify the validity of the input parameters, determine whether the display device has input illegal parameters, and give feedback on error information. After the parameter verification is successful, the system will retrieve the answer based on the input parameters and return the answer to the display device.

A plurality of images refer to images stored in a preset image database. The number of the plurality of images may be 1000, 800, and the like. Specifically, it may be determined according to the real requirements, which is not limited in the embodiment of the present disclosure.

In some examples, a plurality of images may be retrieved from the Internet. For example, a plurality of images may be retrieved from the Internet by entering the keyword "xxx's famous painting".

In some examples, a plurality of images may be selected from the preset painting website. For example, the xx painting website has saved a large number of famous paintings, and a plurality of images may be acquired directly from the xx painting website.

It is understandable that the foregoing examples are only examples for better understanding of the technical solutions of the embodiments of the present disclosure, and are not intended as the limitation to the embodiments of the present disclosure.

After acquiring a plurality of images, step 202 is executed.

Step 202: image description information of the plurality of images is acquired.

Image description information refers to information such as the profile, the image editor, and the like, of each image in the plurality of images, which can reflect the style, author, creation time, and the like of the image.

After acquiring the plurality of images, the image description information of each image may be obtained separately. Specifically, the image description information of each image may be obtained according to the introduction of Baidu Encyclopedia or the description given by related websites.

After acquiring image description information of the plurality of images, step 203 is executed.

Step 203: the plurality of images are stored in a preset image database, with the image description information of the plurality of images as an index.

Figure 2B:
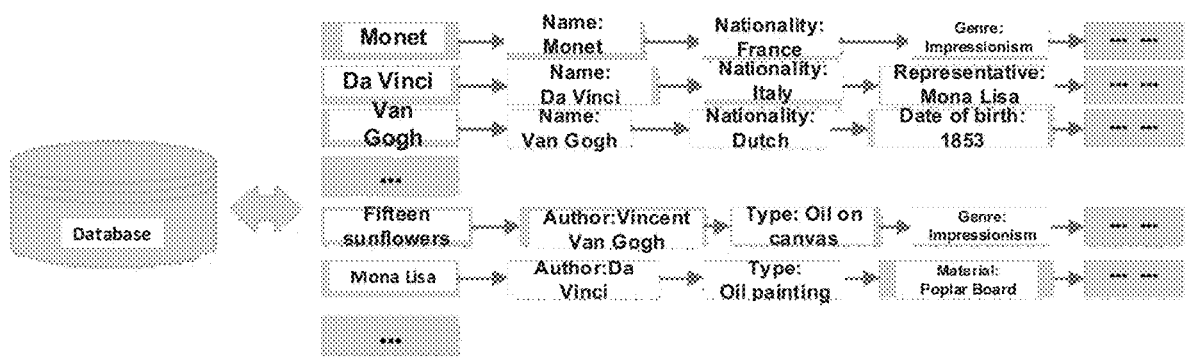
FIG. 2b shows a schematic diagram of an index building method according to an embodiment of the present disclosure.

As shown in FIG. 2*a*, in the system initialization circuit, in order to improve the answer retrieval speed, the solution uses a method similar to the inverted index. Specifically, the image description information of the plurality of images may be stored as an index in a preset image database to build an inverted index of the plurality of images. For example, an inverted index may be built for the painting information or artist information of the paintings in the database, and this information may be loaded into the cache during the system initialization stage, so as to use the retrieval keyword and retrieval intention information to quickly find answers. For example, referring to FIG. 2*b*, a schematic diagram of an index building method according to an embodiment of the present disclosure is shown. As shown in FIG. 2*b*, for "Monet", "Name: Monet" may be used as an index, and relevant descriptions may be added, such as "Nationality: France", "Genre: Impressionism". For "Da Vinci", "Name: Da Vinci" may be used as an index, and relevant descriptions may be added, such as "Nationality: Italy", "Representative: Mona Lisa". For the famous painting "Mona Lisa", the author "Da Vinci" may be used as an index, and relevant descriptions may be added, such as "Type: Oil Painting", "Material: Poplar Board", and the like.

It is understandable that the foregoing examples are only examples for better understanding of the technical solutions of the embodiments of the present disclosure, and are not intended as the limitation to the embodiments of the present disclosure.

When the data volume of the constructed preset image database is small, it may be directly stored in the system cache. When the data volume is large, it may be stored in the Remote Dictionary Server (redis) database. When the answer is retrieved, the redis database may be directly queried. While ensuring system query performance, it can synchronize data in a timely manner.

After storing the plurality of images in a preset image database with the image description information of the plurality of images as an index, step 204 is executed.

Step 204: an image retrieval text input by a user and a screen display status of an image display device are acquired.

The image retrieval text refers to the text input by the user to acquire the image required by the user. The image retrieval text may be a long sentence text or a question text, such as "Who is the author of Mona Lisa?" "Picasso's famous paintings," and the like.

Of course, it is not limited to this. The image retrieval text may also be a keyword text. Specifically, it may be determined according to the real requirements, which is not limited in the embodiment of the present disclosure.

The image display device refers to the device used by the user to input the image retrieval text.

In the present disclosure, the image display device may be a mobile terminal, for example, a mobile electronic device such as a mobile phone, a PAD (Portable Android Device). The image display device may also be a PC (Personal Computer) terminal, such as a desktop computer, a notebook computer, and the like. Specifically, it may be determined according to actual conditions, which is not limited in the embodiment of the present disclosure.

The screen display status refers to the display status of the screen of the image display device. The screen display status may be the horizontal or vertical screen status of the screen, the screen resolution, and the like. Specifically, it may be determined according to real requirements, which is not limited in the embodiment of the present disclosure.

In some examples, the user may provide the screen display status of the image display device when the user enters the image retrieval text, so that the intelligent question and answer system can acquire the screen display status of the image display device.

In some examples, the intelligent question and answer system may ask the user about the screen display status after the user enters the image retrieval text, and acquire the screen display status of the image display device according to the answer input by the user.

It is understandable that the foregoing examples are only examples for better understanding of the technical solutions of the embodiments of the present disclosure, and are not intended as the limitation to the embodiments of the present disclosure.

After acquiring the image retrieval text input by the user and the screen display status of the image display device, step 205 is executed.

Step 205: the retrieval keyword and at least one piece of intention information are acquired according to the image retrieval text.

A retrieval keyword refers to a keyword used to retrieve images, for example, the retrieval keywords in the text "Who is the author of Mona Lisa?" are "Mona Lisa" and "Author"; and the keywords in the text "Picasso's famous paintings" are "Picasso", "famous paintings", and so on.

After acquiring the image retrieval text input by the user, the image retrieval text may be segmented to acquire a plurality of word segmentation texts, and the plurality of word segmentation texts may be combined to obtain a retrieval keyword.

Intention information refers to the intention that can be reflected in the image retrieval text.

After acquiring the image retrieval text input by the user, the image retrieval text may be segmented to acquire a plurality of segmented texts, and then at least one piece of intention information of the image retrieval text may be acquired according to the plurality of segmented texts. For example, when the image retrieval text is "Who is the author of the Mona Lisa?" the intention information that may be acquired is: retrieving the famous painting "Mona Lisa" and retrieving the author of the famous painting "Mona Lisa".

It is understandable that the foregoing examples are only examples for better understanding of the technical solutions of the embodiments of the present disclosure, and are not intended as the limitation to the embodiments of the present disclosure.

After acquiring the retrieval keyword and at least one piece of intention information according to the image retrieval text, step 206 is executed.

Step 206: the retrieval intention information is selected from the at least one piece of intention information according to semantic information of the image retrieval text.

Retrieval intention information refers to information used to reflect the user's retrieval intention. For example, regarding the text "Who is the author of Mona Lisa?" the retrieval intention is to find the author of the painting "Mona Lisa", not to find the painting "Mona Lisa"; and regarding the text "Picasso's famous paintings", the retrieval intention is to find Picasso's famous paintings, not to find Picasso's character information.

After acquiring at least one piece of intention information, retrieval intention information may be determined based on the semantic information of the image retrieval text. Specifically, the context of the image retrieval text and the sentence type of the image retrieval text may be combined to determine the retrieval intention information from the at least one piece of intention information.

It is understandable that the foregoing examples are only examples for better understanding of the technical solutions of the embodiments of the present disclosure, and are not intended as the limitation to the embodiments of the present disclosure.

After the retrieval intention information is selected from the at least one piece of intention information according to the semantic information of the image retrieval text, step 207 is performed.

Step 207: a plurality of candidate images are acquired from the preset image database according to the retrieval keyword.

Candidate images refer to images that are retrieved from the preset image database according to the retrieval keyword and used as candidates provided to the user.

After the retrieval keyword is acquired, a plurality of candidate images may be retrieved from the preset image database according to the retrieval keyword. Specifically, a plurality of candidate images may be retrieved from the preset image database using the retrieval keyword.

This is described as follows in conjunction with FIG. 2a. In the answer extraction circuit of the intelligent question and answer system, the system retrieves painting information based on the retrieval intention information and the retrieval keyword. For example, in response to the question "Who is the author of Mona Lisa?" the semantic understanding circuit will input the following Json command string:

Question={'env':{'picture_id':12345,'direction':'horizontal screen','ID':'123456'}
'nlu' :{ 'intention' : 'the author's name' , 'entities' : [{ 'entity' : 'Mona Lisa' , 'type' :' title' }]}

The command means: the id of the current image display device is '12345', the screen display status is the horizontal screen display state, the retrieval intention information (intention) acquired by the semantic understanding circuit is to ask the author's name, and the retrieval keyword (entities) is Mona Lisa. The system makes search according to the retrieval keyword, Mona Lisa.

In the present disclosure, when there is no index matching the retrieval keyword in the preset image database, a solution such as fuzzy matching or similarity calculation may be used to extract candidate images. Specifically, it will be described in detail in conjunction with the following specific implementation manner.

In a specific implementation manner of the present disclosure, the foregoing step 207 may include the following sub-steps.

Sub-step A1: when there is no index matching the retrieval keyword in the preset image database, a retrieval index whose relevance degree with the retrieval keyword is greater than a relevance degree threshold is acquired.

In the embodiment of the present disclosure, the relevance degree threshold refers to the degree of relevance between the retrieval keyword and the index in the preset image database, which is preset by the system.

When there is no index matching the retrieval keyword in the preset image database, a retrieval index whose relevance degree with the retrieval keyword is greater than the relevance degree threshold may be acquired.

After a retrieval index whose relevance degree with the retrieval keyword is greater than the relevance degree threshold is acquired, sub-step A2 is executed.

Sub-step A2: the plurality of candidate images are acquired from the preset image database according to the retrieval index.

After the retrieval index is acquired, the plurality of candidate images may be acquired from the preset image database according to the retrieval index.

The present disclosure can use fuzzy matching, similarity calculation and other solutions to extract answers when the retrieval keyword cannot be accurately matched, so as to improve the user experience while ensuring the accuracy of the answers.

Of course, when there are paintings with the same name in the database, the system will determine the answer that the user wants based on the relevant attribute value of the paintings, such as the author information, the creation time information, and the like, of the paintings.

After a plurality of candidate images are acquired from the preset image database according to the retrieval keyword, step 208 is executed.

Step 208: at least one candidate image that meets the retrieval intention information is acquired from the plurality of candidate images.

After a plurality of candidate images are acquired from the preset image database according to the retrieval keyword, the plurality of candidate images may be screened according to the retrieval intention information. Specifically, at least one candidate image that meets the retrieval intention information may be acquired from the plurality of candidate images.

After at least one candidate image that meets the retrieval intention information is acquired from the plurality of candidate images, step 209 is executed.

Step 209: at least one candidate target image whose image quality is higher than a quality threshold is selected from the at least one candidate image.

The candidate target image refers to an image with relatively higher image quality that is selected from the at least one candidate image.

The quality threshold refers to the threshold preset by the system for acquiring candidate target images.

After at least one candidate image is acquired, the image quality of each candidate image in the at least one candidate image may be acquired. Then the image quality of each candidate image is used to screen at least one candidate target image whose image quality is higher than a quality threshold from the at least one candidate image.

After at least one candidate target image whose image quality is higher than a quality threshold is selected from the at least one candidate image, step 210 is executed.

Step 210: a target image that meets a screen display condition is selected from the at least one candidate target image according to the screen display status.

The target image refers to the image that is selected from the candidate images according to the screen display status and provided to the user. For example, the candidate images include image 1, image 2, image 3, image 4, and image 5. When image 1 and image 3 are selected from the candidate images according to the screen display status and provided to the user, image 1 and image 3 are the target images.

After at least one candidate target image whose image quality is higher than the quality threshold is selected from the at least one candidate image, a target image that meets the screen display condition may be acquired from the at least one candidate target image according to the screen display status. Specifically, it will be described in detail in combination with the following specific implementation manner.

In a specific implementation manner of the present disclosure, the foregoing step 210 may include the following sub-steps.

Sub-step B1: when the screen display status is a horizontal screen display status, a target image that meets a horizontal screen display condition is selected from the at least one candidate target image.

In the embodiment of the present disclosure, when the screen display status is the horizontal screen display state, a target image that meets a horizontal screen display condition may be selected from the at least one candidate target image. For example, the candidate images include image 1, image 2, image 3, image 4 and image 5. The screen display status of the image display device is a horizontal screen display. Image 1 and image 5 are horizontally displayed images, and image 2, image 3 and image 4 are vertically displayed images. Then image 1 and image 5 are the final target image.

Sub-step B2: when the screen display status is the vertical screen display status, a target image that meets the vertical screen display condition is selected from the at least one candidate target image.

When the screen display status is the vertical screen display state, a target image that meets a vertical screen display condition may be selected from the at least one candidate target image. For example, the candidate images include image 1, image 2, image 3, image 4 and image 5. The screen display status of the image display device is a vertical screen display. Image 1 and image 5 are horizontally displayed images, and image 2, image 3 and image 4 are vertically displayed images. Then image 2, image 3 and image 4 are the final target image.

In the present disclosure, in order to ensure that the extracted answer information meets the current screen display status of the image display device (horizontal or vertical screen display) and some other priority extraction requirements, for example, when searching for paintings, the system will give priority to returning 300 fine paintings with relatively complete data information as the answer. This solution proposes an answer priority matching strategy. It is stipulated that the search results of 300 fine paintings that meet the horizontal or vertical display information are regarded as the first priority (the highest priority), the search results of 300 fine paintings that do not meet the horizontal or vertical display information are regarded as the second priority, the search results of less than 300 fine paintings that meet the horizontal or vertical display information are regarded as the third priority, and the search results of less than 300 fine paintings that do not meet the horizontal or vertical display information are regarded as the fourth priority. The algorithm is as follows. When there is a system service request, the circuit will traverse the entire painting list in turn, and determine whether the result meets the priority conditions. If the result meets both conditions (horizontal or vertical display information, the number of 300), the loop is terminated and the current retrieved painting information is returned. Otherwise, it is determined whether the result meets the requirements of the second priority. If it meets a certain priority, the current painting information is saved, and a flag is set as true. The loop is continued, and only the result with the highest priority is saved in each traverse, until the result with the first priority is found, otherwise the result with the second priority is returned.

Of course, in the embodiment of the present disclosure, the system command processing circuit will process some operation commands, such as increasing the volume, reducing the volume, and the like. The abnormality handling circuit will make a personalized feedback when the system cannot find the answer, and feedback the reason why the answer cannot be found, so as to optimize the system. For example, the system will respond as follows: Answer {'answer':' Xiaoyi hasn't found it yet, try to follow the fine paintings in the AI area of the Huaping APP to get more resources! ', 'Reason':' Corresponding image not found', 'state':'5'}.

In the embodiment of the present disclosure, the retrieval is performed by combining the retrieval intention information and retrieval keyword acquired according to the image retrieval text input by the user. Compared with the retrieval method that is only based on keywords, the amount of feedback data can be greatly reduced. In addition, combining the screen display status of the image display device to acquire the final image can reduce the amount of feedback data and further improve the user experience.

The image acquisition method according to the embodiments of the present disclosure acquires the image retrieval text input by the user and the screen display status of the image display device, determines retrieval intention information and a retrieval keyword according to the image retrieval text, acquires at least one candidate image according to the retrieval intention information and the retrieval keyword, and selects a target image from the at least one candidate image according to the screen display status. In the embodiment of the present disclosure, the retrieval is performed by combining the retrieval intention information and retrieval keyword acquired according to the image retrieval text input by the user. Compared with the retrieval method that is only based on keywords, the amount of feedback data can be greatly reduced. In addition, combining the screen display status of the image display device to acquire the final image can reduce the amount of feedback data and further improve the user experience.

For the foregoing method embodiments, for simplicity of description, they are all expressed as a series of action combinations, but those skilled in the art should know that the present disclosure is not limited by the described sequence of actions, and according to the present disclosure, some steps may be performed in other order or simultaneously. Furthermore, those skilled in the art should also know that the embodiments described in the specification are all schematic embodiments, and the actions and circuits involved are not necessarily required by the present disclosure.

Figure 3:
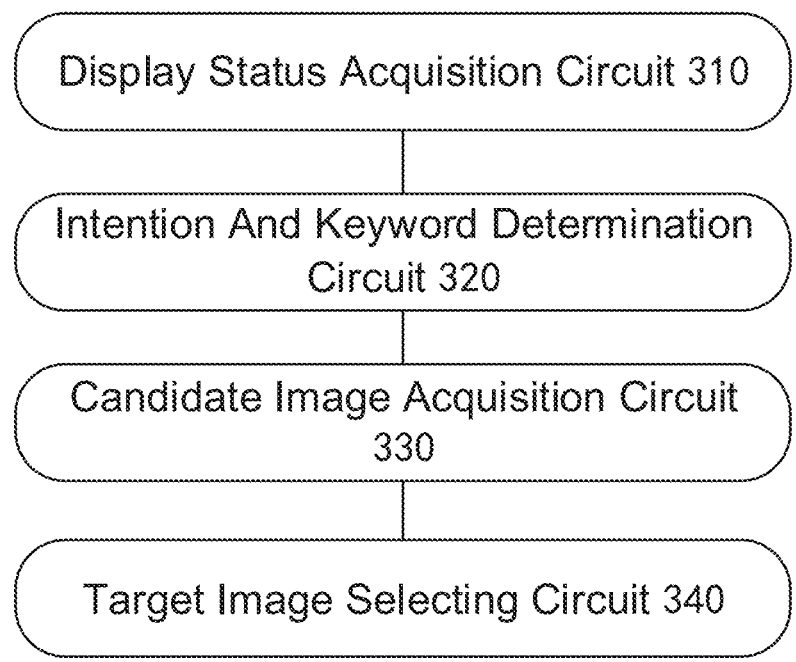
FIG. 3 shows a schematic structural diagram of an image acquisition device according to an embodiment of the present disclosure.

Referring to FIG. 3, there is shown a schematic structural diagram of an image acquisition device according to an embodiment of the present disclosure. As shown in FIG. 3, the image acquisition device may include:

a display status acquisition circuit 310 configured to acquire an image retrieval text input by a user and a screen display status of an image display device;

an intention and keyword determination circuit 320 configured to determine retrieval intention information and a retrieval keyword according to the image retrieval text, wherein the retrieval intention information includes information reflecting the user's retrieval intention, and the retrieval keyword includes a keyword used to retrieve images;

a candidate image acquisition circuit 330 configured to acquire at least one candidate image according to the retrieval intention information and the retrieval keyword; and a target image selecting circuit 340 configured to select a target image from the at least one candidate image according to the screen display status.

The image acquisition device according to the embodiments of the present disclosure acquires the image retrieval text input by the user and the screen display status of the image display device, determines retrieval intention information and a retrieval keyword according to the image retrieval text, acquires at least one candidate image according to the retrieval intention information and the retrieval keyword, and selects a target image from the at least one candidate image according to the screen display status. In the embodiment of the present disclosure, the retrieval is performed by combining the retrieval intention information and retrieval keyword acquired according to the image retrieval text input by the user. Compared with the retrieval method that is only based on keywords, the amount of feedback data can be greatly reduced. In addition, combining the screen display status of the image display device to acquire the final image can reduce the amount of feedback data and further improve the user experience.

Figure 4:
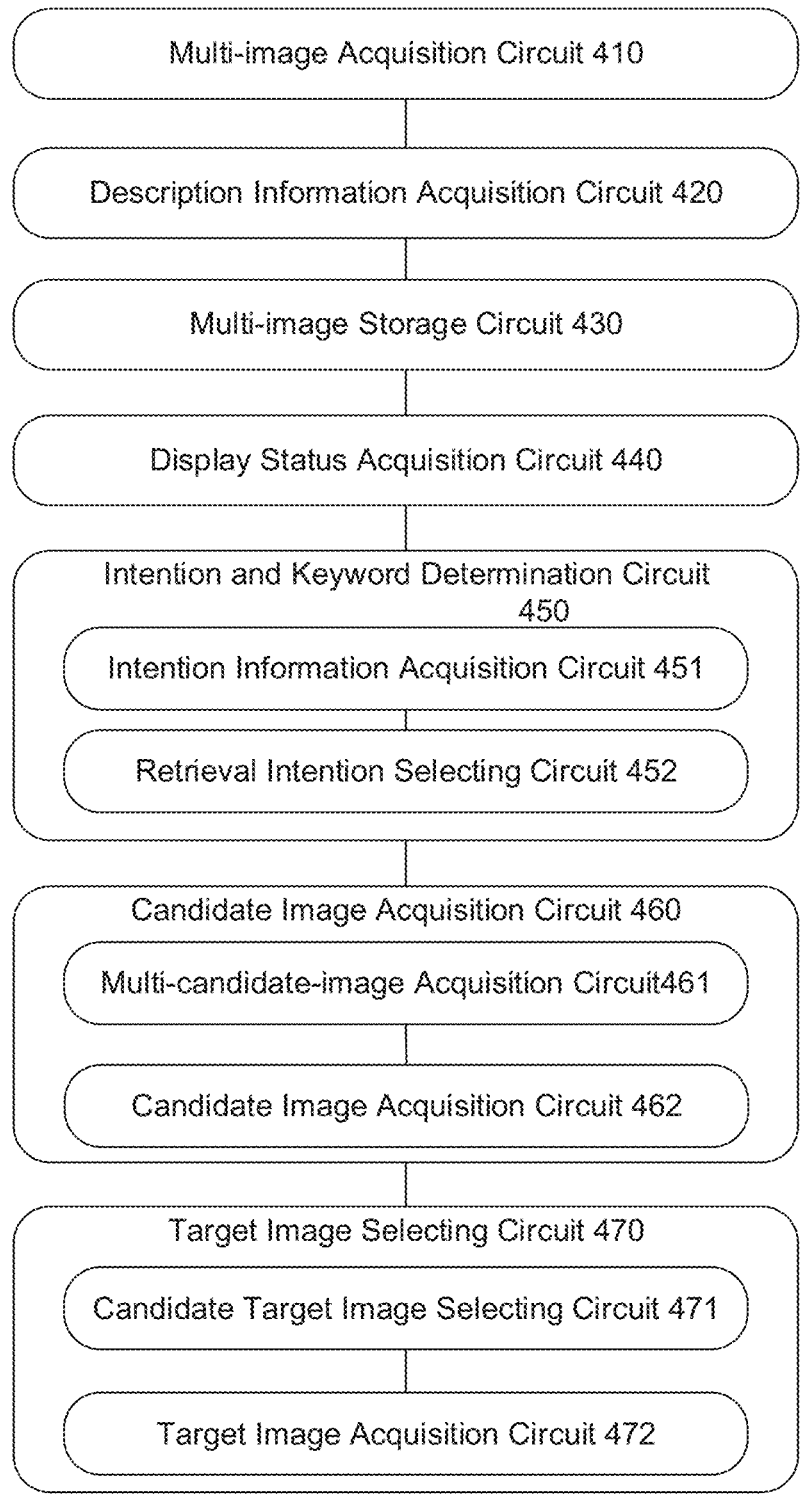
FIG. 4 shows a schematic structural diagram of another image acquisition device according to an embodiment of the present disclosure.

Referring to FIG. 4, there is shown a schematic structural diagram of an image acquisition device according to an embodiment of the present disclosure. As shown in FIG. 4, the image acquisition device may include:

a multi-image acquisition circuit 410 configured to acquire a plurality of images;

a description information acquisition circuit 420 configured to acquire image description information of the plurality of images;

a multi-image storage circuit 430 configured to store the plurality of images in a preset image database, with the image description information of the plurality of images as an index;

a display status acquisition circuit 440 configured to acquire an image retrieval text input by a user and a screen display status of an image display device;

an intention and keyword determination circuit 450 configured to determine the retrieval intention information and a retrieval keyword according to the image retrieval text;

a candidate image acquisition circuit 460 configured to acquire at least one candidate image according to the retrieval intention information and the retrieval keyword; and a target image selecting circuit 470 configured to select a target image from the at least one candidate image according to the screen display status.

Alternatively, the intention and keyword determination circuit 450 includes:

an intention information acquisition circuit 451 configured to acquire the retrieval keyword and at least one piece of intention information according to the image retrieval text;

a retrieval intention selecting circuit 452 configured to select the retrieval intention information from the at least one piece of intention information according to semantic information of the image retrieval text.

Alternatively, the candidate image acquisition circuit 460 includes:

a multi-candidate-image acquisition circuit 461 configured to acquire a plurality of candidate images from the preset image database according to the retrieval keyword; and a candidate image acquisition circuit 462 configured to acquire at least one candidate image that meets the retrieval intention information from the plurality of candidate images.

Alternatively, the multi-candidate-image acquisition circuit 461 includes:

a retrieval index acquisition subcircuit configured to, when there is no index matching the retrieval keyword in the preset image database, acquire a retrieval index whose relevance degree with the retrieval keyword is greater than a relevance degree threshold; and a multi-candidate-image acquisition subcircuit configured to acquire the plurality of candidate images from the preset image database according to the retrieval index.

Alternatively, the target image selecting circuit 470 includes:

a candidate target image selecting circuit 471 configured to select at least one candidate target image whose image quality is higher than a quality threshold from the at least one candidate image; and a target image acquisition circuit 472 configured to select a target image that meets a screen display condition from the at least one candidate target image according to the screen display status.

Alternatively, the target image acquisition circuit 472 includes:

a first target image selecting subcircuit configured to, when the screen display status is a horizontal screen display status, select a target image that meets a horizontal screen display condition from the at least one candidate target image;

a second target image selecting subcircuit configured to, when the screen display status is a vertical screen display status, select a target image that meets a vertical screen display condition from the at least one candidate target image.

The image acquisition device according to the embodiments of the present disclosure acquires the image retrieval text input by the user and the screen display status of the image display device, determines retrieval intention information and a retrieval keyword according to the image retrieval text, acquires at least one candidate image according to the retrieval intention information and the retrieval keyword, and selects a target image from the at least one candidate image according to the screen display status. In the embodiment of the present disclosure, the retrieval is performed by combining the retrieval intention information and retrieval keyword acquired according to the image retrieval text input by the user. Compared with the retrieval method that is only based on keywords, the amount of feedback data can be greatly reduced. In addition, combining the screen display status of the image display device to acquire the final image can reduce the amount of feedback data and further improve the user experience.

Additionally, an embodiment of the present disclosure also provides an electronic device, including: a processor, and a memory having a computer program stored thereon and executable by the processor, wherein the processor executes the program to implement the above-mentioned image acquisition method.

The embodiment of the present disclosure also provides a computer-readable storage medium storing computer instructions that, when executed by a processor of an electronic device, enable the electronic device to execute the above-mentioned image acquisition method.

The embodiments in this specification are described in a progressive manner. Each embodiment focuses on the differences from other embodiments, and the same or similar parts between the embodiments may refer to each other.

Finally, it should also be noted that relational terms such as first and second herein are used only to distinguish one entity or operation from another entity or operation, and do not necessarily require or imply that there is any such actual relationship or order among these entities or operations. In addition, the terms "include", "including" or any other variants thereof are intended to cover non-exclusive inclusion, so that a process, method, article or device including a series of elements includes not only those elements, and it also includes other elements not explicitly listed, or elements inherent to such a process, method, product, or device. Without more restrictions, an element limited by the sentence "including a . . . " does not exclude that there are other identical elements in the process, method, product, or device that includes the element.

The image acquisition method, image acquisition device, electronic device, and computer-readable storage medium according to the present disclosure have been described in detail above. In the present disclosure, specific embodiments are used to describe the principle and implementation manners of the present disclosure. The description of the foregoing embodiments is merely used to help understand the method and core idea of the present disclosure. Meanwhile, for those skilled in the art, the idea of the present disclosure may have variations in specific implementation manners and application scope. To sum up, the content of the description should not be construed as a limitation on the present disclosure.

We claim:
1. An image acquisition method, comprising:
  acquiring an image retrieval text input by a user and a screen display status of an image display device;
  determining retrieval intention information and a retrieval keyword according to the image retrieval text, wherein the retrieval intention information comprises information reflecting the user's retrieval intention, and the retrieval keyword comprises a keyword used to retrieve images;
  acquiring at least one candidate image according to the retrieval intention information and the retrieval keyword; and
  selecting a target image from the at least one candidate image according to the screen display status,
  wherein before the acquiring the image retrieval text input by the user and the screen display status of the image display device, the method further comprises:
  acquiring a plurality of images;
  acquiring image description information of the plurality of images; and
  storing the plurality of images in a preset image database, with the image description information of the plurality of images as an index, and
  wherein the acquiring at least one candidate image according to the retrieval intention information and the retrieval keyword comprises:
  acquiring a plurality of candidate images from the preset image database according to the retrieval keyword; and
  acquiring at least one candidate image that meets the retrieval intention information from the plurality of candidate images.

2. The method of claim 1, wherein the determining retrieval intention information and a retrieval keyword according to the image retrieval text comprises:
  acquiring the retrieval keyword and at least one intention information according to the image retrieval text; and
  selecting, as the retrieval intention information, at least one intention information from a plurality of intention information according to semantic information of the image retrieval text.

3. The method of claim 1, wherein the acquiring a plurality of candidate images from the preset image database according to the retrieval keyword comprises:
  when there is no index matching the retrieval keyword in the preset image database, acquiring a retrieval index whose relevance degree with the retrieval keyword is greater than a relevance degree threshold; and
  acquiring the plurality of candidate images from the preset image database according to the retrieval index.

4. The method of claim 1, wherein the selecting the target image from the at least one candidate image according to the screen display status comprises:
  selecting at least one candidate target image whose image quality is higher than a quality threshold from the at least one candidate image; and
  selecting a target image that meets a screen display condition from the at least one candidate target image according to the screen display status.

5. The method of claim 4, wherein the selecting a target image that meets the screen display condition from the at least one candidate target image according to the screen display status comprises:
  when the screen display status is a horizontal screen display status, selecting a target image that meets a horizontal screen display condition from the at least one candidate target image; and when the screen display status is a vertical screen display status, selecting a target image that meets a vertical screen display condition from the at least one candidate target image.

6. An image acquisition device, comprising:
a display status acquisition circuit configured to acquire an image retrieval text input by a user and a screen display status of an image display device;
an intention and keyword determination circuit configured to determine retrieval intention information and a retrieval keyword according to the image retrieval text, wherein the retrieval intention information comprises information reflecting the user's retrieval intention, and the retrieval keyword comprises a keyword used to retrieve images;
a candidate image acquisition circuit configured to acquire at least one candidate image according to the retrieval intention information and the retrieval keyword;
a target image selecting circuit configured to select a target image from the at least one candidate image according to the screen display status,
a multi-image acquisition circuit configured to acquire a plurality of images;
a description information acquisition circuit configured to acquire image description information of the plurality of images; and
a multi-image storage circuit configured to store the plurality of images in a preset image database, with the image description information of the plurality of images as an index,
wherein the candidate image acquisition circuit comprises:
a multi-candidate-image acquisition circuit configured to acquire a plurality of candidate images from the preset image database according to the retrieval keyword; and
a candidate image acquisition circuit configured to acquire at least one candidate image that meets the retrieval intention information from the plurality of candidate images.

7. The device of claim 6, wherein the intention and keyword determination circuit comprises:
an intention information acquisition circuit configured to acquire the retrieval keyword and at least one intention information according to the image retrieval text; and
a retrieval intention selecting circuit configured to select, as the retrieval intention information, at least one intention information from a plurality of intention information according to semantic information of the image retrieval text.

8. The device of claim 6, wherein the multi-candidate-image acquisition circuit comprises:
a retrieval index acquisition subcircuit configured to, when there is no index matching the retrieval keyword in the preset image database, acquire a retrieval index whose relevance degree with the retrieval keyword is greater than a relevance degree threshold; and
a multi-candidate-image acquisition subcircuit configured to acquire the plurality of candidate images from the preset image database according to the retrieval index.

9. An electronic device, comprising:
a processor;
a memory storing a computer program which, when executed by the processor, causes the processor to:
acquire an image retrieval text input by a user and a screen display status of an image display device;
determine retrieval intention information and a retrieval keyword according to the image retrieval text, wherein the retrieval intention information comprises information reflecting the user's retrieval intention, and the retrieval keyword comprises a keyword used to retrieve images;
acquire at least one candidate image according to the retrieval intention information and the retrieval keyword;
select a target image from the at least one candidate image according to the screen display status;
acquire a plurality of images;
acquire image description information of the plurality of images;
store the plurality of images in a preset image database, with the image description information of the plurality of images as an index,
acquire a plurality of candidate images from the preset image database according to the retrieval keyword; and
acquire at least one candidate image that meets the retrieval intention information from the plurality of candidate images.

10. The electronic device of claim 9, wherein the computer program, when executed by the processor, further causes the processor to:
acquire the retrieval keyword and at least one intention information according to the image retrieval text; and
select, as the retrieval intention information, at least one intention information from a plurality of intention information according to semantic information of the image retrieval text.

11. The electronic device of claim 9, wherein the computer program, when executed by the processor, further causes the processor to:
when there is no index matching the retrieval keyword in the preset image database, acquire a retrieval index whose relevance degree with the retrieval keyword is greater than a relevance degree threshold; and
acquire the plurality of candidate images from the preset image database according to the retrieval index.

12. The electronic device of claim 9, wherein the computer program, when executed by the processor, further causes the processor to:
select at least one candidate target image whose image quality is higher than a quality threshold from the at least one candidate image; and
select a target image that meets a screen display condition from the at least one candidate target image according to the screen display status.

13. The electronic device of claim 12, wherein the computer program, when executed by the processor, further causes the processor to:
when the screen display status is a horizontal screen display status, select a target image that meets a horizontal screen display condition from the at least one candidate target image; and
when the screen display status is a vertical screen display status, select a target image that meets a vertical screen display condition from the at least one candidate target image.

14. A non-volatile computer-readable storage medium storing computer instructions that, when executed by a processor of an electronic device, enable the electronic device to execute the image acquisition method of claim 1.

* * * * *